く12) United States Patent
Rawdon et al.

(10) Patent No.: US 10,807,728 B2
(45) Date of Patent: Oct. 20, 2020

(54) SOLAR POWERED AIRPLANE

(71) Applicant: The Boeing Company, Chicago, IL (US)

(72) Inventors: Blaine Knight Rawdon, San Pedro, CA (US); Aaron J. Kutzmann, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 1417 days.

(21) Appl. No.: 14/283,149

(22) Filed: May 20, 2014

(65) Prior Publication Data
US 2016/0144969 A1 May 26, 2016

(51) Int. Cl.
B64D 27/24 (2006.01)
B64C 23/06 (2006.01)
B64C 3/18 (2006.01)
B64C 39/10 (2006.01)
B64C 39/02 (2006.01)

(52) U.S. Cl.
CPC .............. B64D 27/24 (2013.01); B64C 3/185 (2013.01); B64C 23/069 (2017.05); B64C 39/024 (2013.01); B64C 39/10 (2013.01); B64C 2201/028 (2013.01); B64C 2201/042 (2013.01); B64C 2211/00 (2013.01); B64D 2211/00 (2013.01); Y02T 50/164 (2013.01); Y02T 50/55 (2018.05)

(58) Field of Classification Search
CPC ....... B64C 23/065; B64C 39/10; B64C 39/00; B64C 39/028; B64C 39/068; B64C 3/24; B64C 9/38; B64D 41/00; B64D 29/04
USPC ...... 244/199.4, 13, 45 R, 91, 62, 58, 36, 52, 244/53 R, 124
See application file for complete search history.

(56) References Cited

U.S. PATENT DOCUMENTS 5,810,284 A * 9/1998 Hibbs ..................... B64C 39/10
244/13
7,137,592 B2 * 11/2006 Barocela et al. ............... 244/29
(Continued)

FOREIGN PATENT DOCUMENTS

CN 1420828 A 5/2003
CN 102464105 A 5/2012
(Continued)

OTHER PUBLICATIONS

Helios Prototype: The forerunner of 21st century solar-powered "atmospheric satellites", NASA, 2002.*
(Continued)

Primary Examiner — Assres H Woldemaryam
(74) Attorney, Agent, or Firm — Kolisch Hartwell, P.C.

(57) ABSTRACT

A solar powered aircraft including a modular main wing and a pair of relatively large modular winglets attached to the transverse end portions of the main wing. To collect solar radiation, including relatively low-angle radiation, solar panels are mounted to both the main wing and the winglets. In some embodiments, the aspect ratio of the main wing is relatively low, such as between 9 and 15, i.e., the main wing is relatively deep compared to its wing span. In some embodiments, the winglets are relatively long, such as in the range of 0.2 to 0.7 times the length of the main wing semi-span. In some embodiments, a truss-like spar passes through and helps support the wing and the winglets.

20 Claims, 7 Drawing Sheets

(56) References Cited

U.S. PATENT DOCUMENTS

| | | | |
|---|---|---|---|
| 7,762,495 B2* | 7/2010 | Miller | 244/13 |
| 8,720,822 B2* | 5/2014 | Vaneck et al. | 244/123.1 |
| 2002/0005454 A1* | 1/2002 | MacCready et al. | 244/5 |
| 2002/0096599 A1* | 7/2002 | McDermott | B64B 1/08 244/25 |
| 2003/0141409 A1* | 7/2003 | Lisoski | B64C 3/42 244/13 |
| 2004/0118969 A1* | 6/2004 | MacCready et al. | 244/5 |
| 2005/0118952 A1* | 6/2005 | Cox | B64C 3/42 455/62 |
| 2006/0278757 A1* | 12/2006 | Kelleher | B64C 37/02 244/63 |
| 2008/0001028 A1* | 1/2008 | Kendall et al. | 244/75.1 |
| 2009/0294573 A1* | 12/2009 | Wilson | B64C 39/024 244/2 |
| 2010/0193625 A1* | 8/2010 | Sommer | 244/2 |
| 2010/0213309 A1* | 8/2010 | Parks | 244/46 |
| 2011/0031354 A1* | 2/2011 | Kelleher | 244/45 R |
| 2012/0091267 A1 | 4/2012 | Parks | |
| 2013/0099063 A1* | 4/2013 | Grip et al. | 244/219 |
| 2014/0252156 A1* | 9/2014 | Hiebl et al. | 244/3 |

FOREIGN PATENT DOCUMENTS

| | | |
|---|---|---|
| CN | 103587687 A | 2/2014 |
| EP | 2583895 A2 | 4/2013 |
| WO | 9628343 A1 | 9/1996 |
| WO | 0158758 A2 | 8/2001 |
| WO | WO01/58758 A2 * | 8/2001 ............ B64C 39/02 |
| WO | 2004106156 A1 | 12/2004 |
| WO | 2008085536 A2 | 7/2008 |
| WO | 2009036465 A1 | 3/2009 |
| WO | 2009036465 A9 | 3/2009 |

OTHER PUBLICATIONS

European Patent Office, Extended European Search Report regarding European Patent Application No. 15166599.9, dated Sep. 28, 2015, 9 pages.

European Patent Office, Office Action Communication Pursuant to Article 94(3) EPC in European Patent Application No. 15 166 599.9-1754, dated Mar. 23, 2017, 6 pages.

The State Intellectual Property Office of the People's Republic of China, Notification of the Second Office Action regarding Chinese Patent Application No. 2015102596184, dated Feb. 28, 2019, 12 pages.

European Patent Office, Office Action regarding European Patent Application No. 15166599.9-1010, dated Mar. 16, 2018, 6 pages.

The State Intellectual Property Office of the People's Republic of China, Notification of the First Office Action and Search Report regarding Chinese Patent Application No. 2015102596184, dated Apr. 4, 2018, 15 pages.

The State Intellectual Property Office of the People's Republic of China, Decision of Rejection regarding Chinese Patent Application No. 2015102596184, dated Jul. 16, 2019, 10 pages.

* cited by examiner

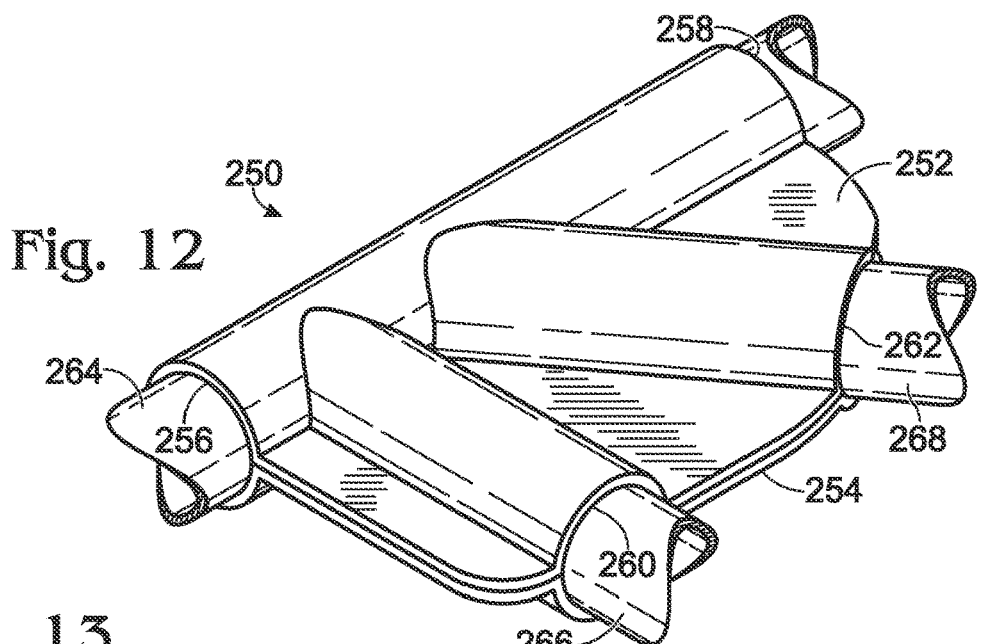
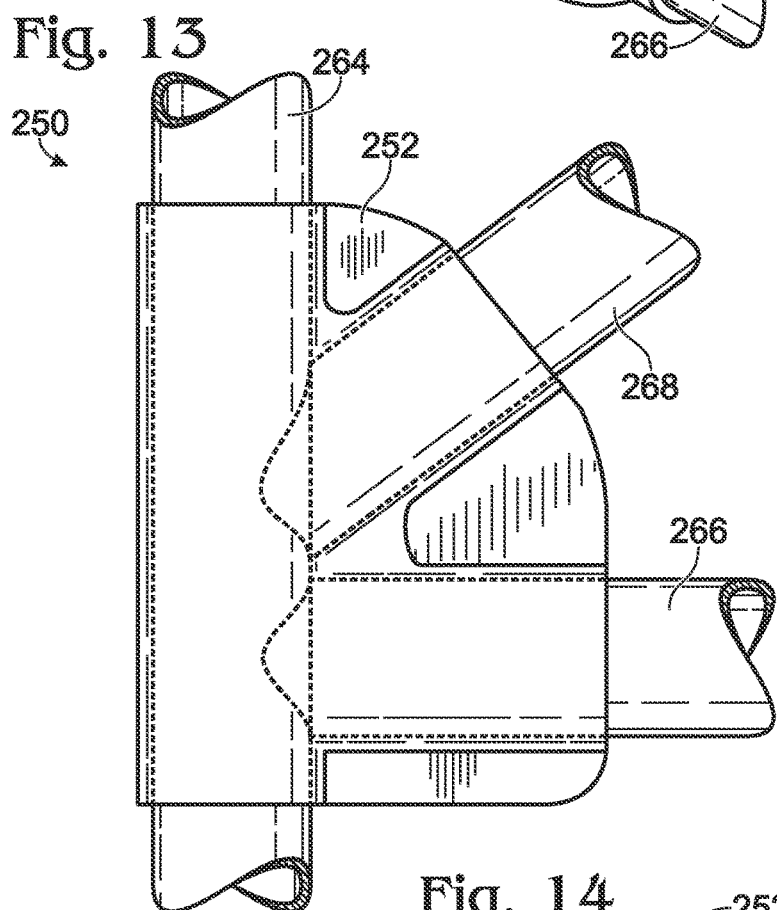
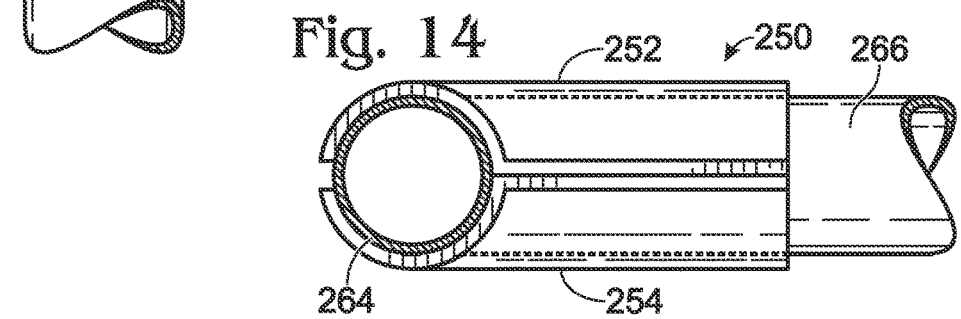

SOLAR POWERED AIRPLANE

CROSS-REFERENCES

The following related applications are incorporated by reference herein, in their entireties, for all purposes: U.S. Patent Pub. No. 2013/0099063 to Grip et al.

FIELD

This disclosure relates to a solar powered airplane. More specifically, the disclosed embodiments relate to a solar powered airplane capable of placing a payload at high altitude above a point on the earth's surface for a relatively long time, such as days, months or even years.

BACKGROUND

For various reasons, it may be desirable to place a payload above a point on the earth's surface for a relatively long time. Potential payloads include imaging systems such as a camera or radar; communication systems for use with radio signals, cell phone signals, microwave transmissions, earth-to-satellite links, television broadcasts, internet connections, payload-to-payload linkages, and the like; atmospheric sensing systems for measuring wind, temperature, humidity, gases present, sunlight, and other purposes. Maintaining a relatively fixed position above a point on the earth's surface enables many such payload systems to operate in a simple and/or effective manner.

Aside from maintaining a payload at a fixed position relative to the surface of the earth, it is also desirable to maintain the payload at a favorable altitude. If the payload is at too low an altitude, its utility may be reduced because its field of view is diminished, weather effects may be increased, obscuration by clouds may be more common, and other obstacles to efficient operation may be present. If the payload is at too high an altitude, its ability to resolve objects on the earth's surface may be diminished, electronic transmission signals must be stronger to reach the payload with sufficient strength, and signals emitted from the payload must be stronger to reach the earth's surface with sufficient strength. Accordingly, there is a range of altitudes that may be desirable for many payloads.

One potential way to maintain a payload at a fixed position above the earth's surface and at a desirable altitude is with an airplane. However, a conventionally fueled airplane can only stay aloft for a matter of hours or days, based on its fuel capacity and rate of fuel usage. A nuclear powered airplane might feasibly remain aloft for a long period of time, but this approach faces opposition and certain risks. Therefore, solar power may be the one of the few feasible methods of providing long duration propulsion to an airplane. However, there are many difficulties associated with accomplishing this successfully.

Solar power is very weak in terms of energy flux, providing at most about 100 Watts per square foot. For example, if a Boeing 747 were equipped with perfectly efficient solar cells on its entire upper wing surface, it would receive at most approximately 600 kilowatts, or about 800 horsepower from the solar cells. This compares with approximately 100,000 horsepower required for the 747 to maintain cruising speed and altitude. Thus, solar power can provide only 0.8% of the needed power to a conventional 747, even if the solar cells are 100% efficient and the sun is directly above the airplane. With typical very good cells, solar power can provide only 0.3% of the needed power to a 747. The conclusion is that a very special airplane is needed—one that can fly on very low power while gathering lots of solar energy.

In addition, to fly continuously over a selected point, an airplane must fly in all seasons, and fly over a large fraction of the earth's surface with an emphasis on populated regions. Therefore, it is desirable to be able to fly at relatively large (absolute) latitudes, where during winter the length of daytime will be shortened and sunlight will arrive from a raking angle rather than from overhead. For example, at Hood River, Oreg. (latitude 46 degrees North) at the winter solstice, there are approximately 8.3 hours of daylight and the maximum elevation of the sun is only around 21.5 degrees. This means that it is desirable to effectively collect solar energy for relatively few hours per day and from very low sun angles, while still collecting and providing sufficient energy to keep the airplane aloft at the desired altitude. Characteristics of an airplane that can meet these requirements are likely to include, for example, low powered flight, light weight, low aerodynamic drag, and the ability to accommodate an efficient energy storage system.

Other solar powered airplanes have been proposed and even flown. For example, one previously developed example includes a large flying wing configuration with solar cells mounted on the upper wing surface and an energy storage system to capture excess energy during the day and provide the stored energy at night in an attempt to continue flight. However, this airplane lacks sufficient solar panel area to absorb low-elevation sunlight, which limits its operation at higher altitudes, especially in winter. For the same reason, many of earth's more populated temperate regions are beyond the reach of this airplane in any season.

An additional drawback of known designs is a very high aspect ratio, which is defined as the wingspan squared divided by the wing area. For a constant-chord wing, aspect ratio is also the wing span divided by the chord, where the chord is the straight line distance between the leading and trailing edges of the wing. Thus, a high aspect ratio wing has a short wing chord and a resulting shallow wing depth, which is the maximum thickness in the vertical dimension of the wing cross section. For example, one known prototype has a wing span of approximately 250 feet, but a wing depth of only around 1.1 feet. This results in problems such as a relatively heavy supporting wing spar compared to the lift generated by the wing, a wing that tends to be flexible in bending, and a wing that tends to be flexible in torsion (i.e., that tends to twist). The results of these characteristics include complicated and challenging flight control characteristics, and potential in-flight structural failure.

Similarly, other known solar airplane prototypes are unable to collect enough low-angle sunlight to fly at many desirable latitudes, cannot maintain sufficient airspeed to fly in many typical weather conditions, and/or cannot fly at desired altitudes. Accordingly, there is a need for an improved solar powered airplane that is capable of maintaining a desired altitude, for an indefinite period of time, over a wide range of latitudes and weather conditions.

SUMMARY

The present disclosure provides a solar powered aircraft including a modular main wing and a pair of relatively large modular winglets attached to the transverse end portions of the main wing. To collect solar radiation, including relatively low-angle radiation, solar panels are mounted to both the main wing and the winglets. In some embodiments, the aspect ratio of the main wing is relatively low, such as between 9 and 15. As a result the main wing is relatively deep compared to its wing span. In some embodiments, the winglets are relatively long, such as in the range of 0.2 to 0.7 times the length of the main wing semi-span. In some embodiments, a truss-like spar passes through and helps support the wing and the winglets. The features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 12 is an isometric view of a joint structure embodiment that may be used to join together wing spar longerons and interstitial elements, according to aspects of the present disclosure.

FIG. 13 is a partially transparent top view of a portion of the joint structure of FIG. 12.

FIG. 14 is an elevational view of the joint structure portion of FIGS. 12-13.

DESCRIPTION

Overview

Figure 1A:
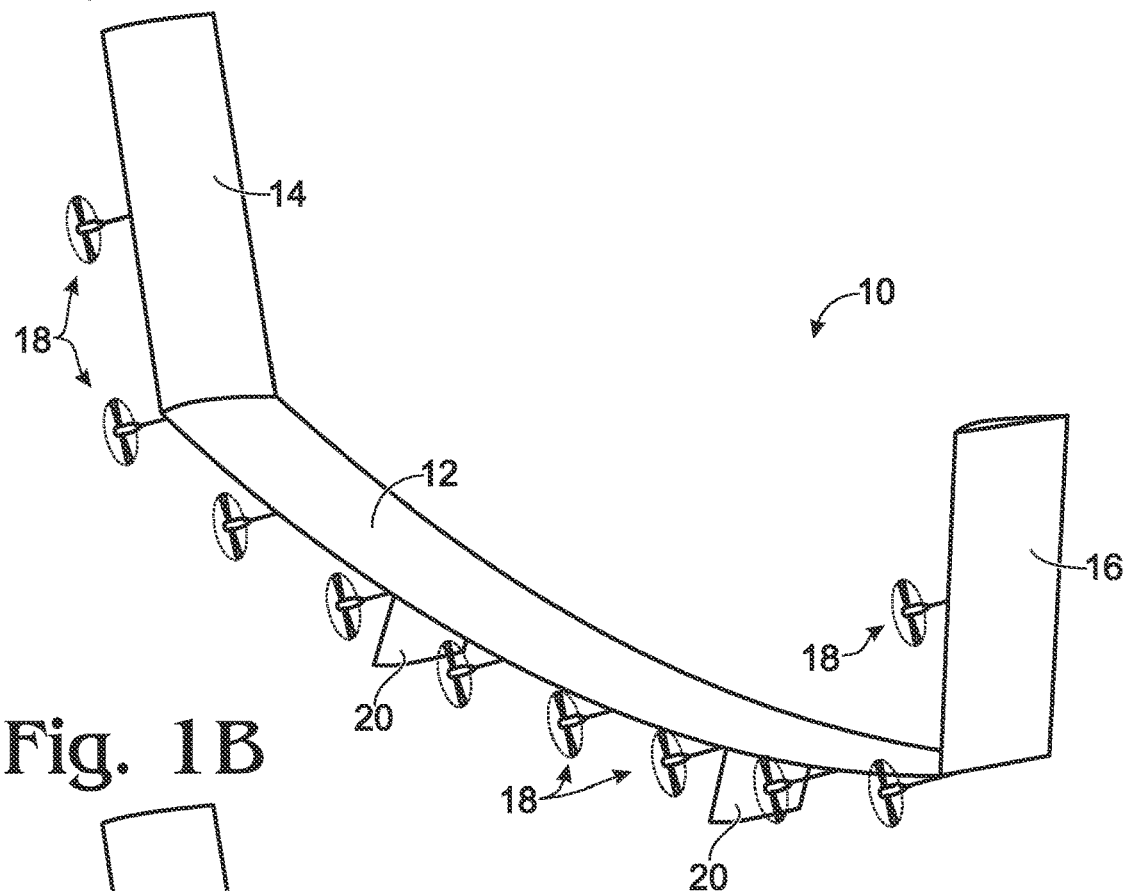
FIG. 1A is an isometric view of an embodiment of a solar powered airplane, according to aspects of the present disclosure.

Various embodiments of a solar powered airplane having relatively large winglets, a relatively low aspect ratio, a modular design and/or a truss-like spar are described below and illustrated in the associated drawings. Unless otherwise specified, the disclosed solar powered airplane and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the disclosed solar powered airplane may, but are not required to, be included in other similar solar powered airplanes. The following description of various embodiments is merely exemplary in nature and is in no way intended to limit the invention, its application or uses. Additionally, the advantages provided by the embodiments, as described below, are illustrative in nature and not all embodiments provide the same advantages or the same degree of advantages.

Definitions

As used herein, the following terms have the definitions provided below:

"Main wing section" means the approximately horizontal portion of the entire wing exclusive of the winglets.

"Winglet" means the approximately vertical portion of the wing outboard of the main wing section.

"Wing span" means the largest dimension of a wing taken in the spanwise direction. In the case of an airplane with winglets, the wing span is the dimension from winglet tip to winglet tip.

"Wing area" means the total projected surface area of a wing, where the projection is made in a vertical direction onto a horizontal plane. In the case of an airplane with winglets, wing area refers to the projected area of the wing and winglets.

"Wing sweep angle" means the angle at which the wing is angled with respect to a line perpendicular to the longitudinal axis of the airplane, as seen in plan view. The wing sweep angle is typically referenced to a line on the wing that follows some constant chord fraction, for instance the wing quarter chord.

"Winglet sweep angle" means the angle at which a winglet is angled with respect to the vertical-lateral plane as seen from a view perpendicular to the plane of the winglet. The winglet sweep angle is typically referenced to a line of constant chord fraction.

"Aspect ratio" is equal to the wing span squared divided by the wing area.

"Winglet span" is equal to the true winglet length expressed as a fraction of main wing semi-span, i.e. as a fraction of one half of the main wing span.

"Chord" means the straight line distance between leading and trailing edges of a wing or winglet.

"Solar cell" means an individual photovoltaic cell. For example, a typical cell may be roughly 4 inches square and very thin, perhaps on the order of 0.020 inches in thickness.

"Solar panel" means an assembly of solar cells into a sheet of cells. For example, a typical solar panel may be approximately 3.5 feet by 20 feet in size. Thickness may be on the order of 0.025 inches.

"Wing panel" means a short spanwise segment of a wing (e.g., approximately 3.5 ft in span×20.8 ft in chord). A wing panel includes a solar panel and supporting wing substructure but does not include a wing spar.

"Wing spar" means the spar across the entire main wing and winglets.

"Wing spar section" means a portion of the entire wing spar. For example, it may be approximately the same span as a wing section (36 feet) with a cross section of approximately 2.5 feet by 2.5 feet.

"Wing section" means a longer spanwise segment of the wing. For example, it may be approximately 36 feet in span by 20.8 feet in chord. It is an assembly of multiple wing panels and a wing spar section.

"Propulsion module" means an assembly that includes a motor, propeller, motor controller and other propulsion systems as well as aerodynamic fairings.

"Fuselage module" means an assembly that may include aircraft or payload systems and landing gear. It may be integrated with a propulsion module. It may include an aerodynamic fairing.

SPECIFIC EXAMPLES, MAJOR COMPONENTS, AND ALTERNATIVES

Example 1

This example describes illustrative solar powered airplanes having a modular structure, relatively large winglets and a relatively low aspect ratio; see FIGS. 1-4.

Figure 1B:
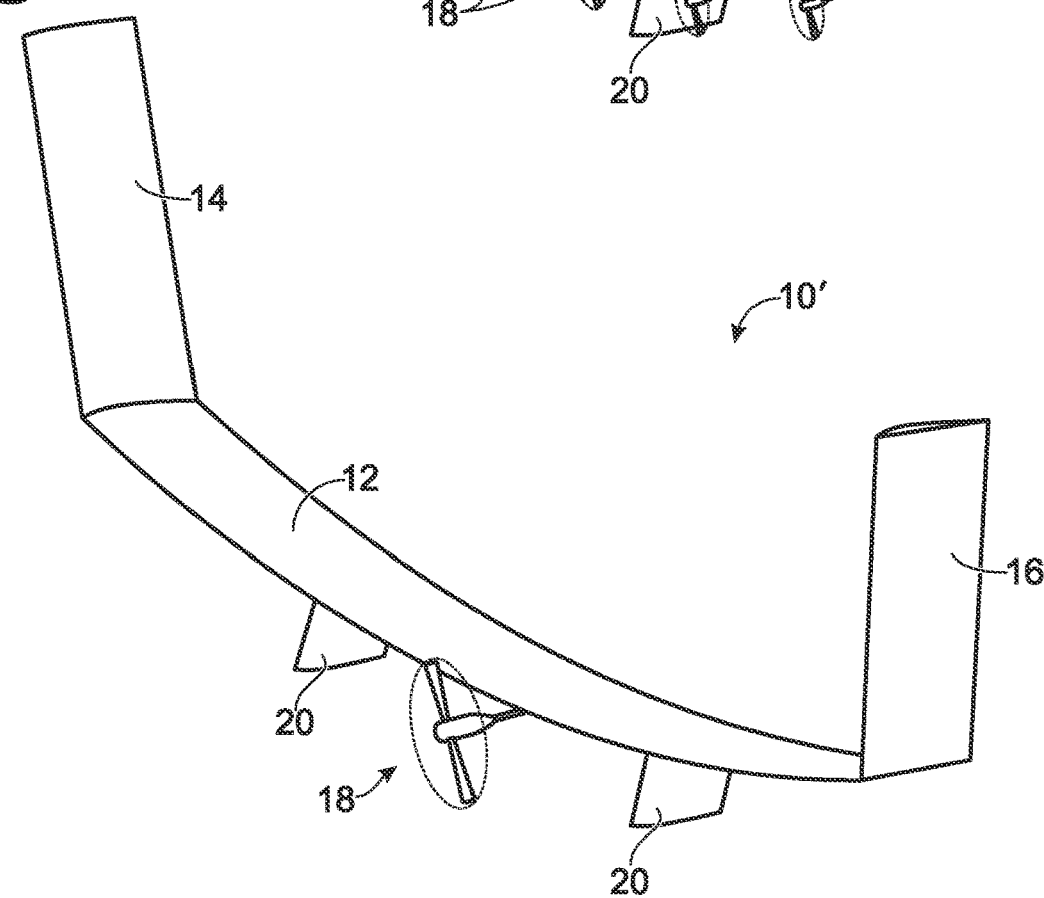
FIG. 1B is an isometric view of another embodiment of a solar powered airplane, according to aspects of the present disclosure.
Figure 2:
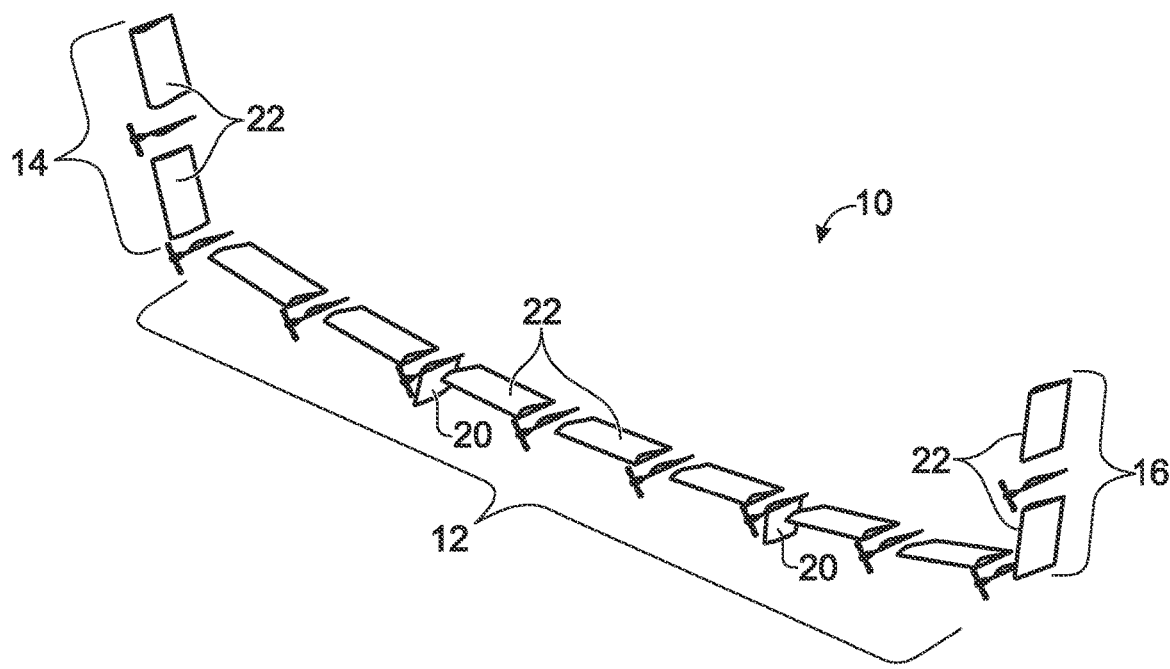
FIG. 2 is a partially exploded tri-metric view of the solar powered airplane embodiment of FIG. 1A, illustrating possible modularity of the embodiment.

FIG. 1A is an isometric view and FIG. 2 is a partially exploded tri-metric view depicting a solar powered airplane, generally indicated at 10, according to aspects of the present teachings. Airplane 10 includes a main wing 12, first and second winglets 14, 16 attached to respective transverse end portions of the main wing, a plurality of propulsion modules each indicated at 18, and a pair of fuselage modules 20. More generally, any desired number of propulsion modules and fuselage modules may be provided. For example, FIG. 1B is an isometric view depicting an alternative airplane, generally indicated at 10', which includes only a single propulsion module 18'. Airplane 10' is otherwise similar to airplane 10, and will therefore not be separately described below. Furthermore, although FIGS. 1-2 show an airplane without wing or winglet sweep, in other cases it may be that wing or winglet sweep is desirable.

Main wing 12 includes a plurality of modular wing panels each indicated at 22, and a wing spar (not shown in FIGS. 1-2) passing through the wing panels. Similarly, winglets 14, 16 also each include a plurality of modular wing panels 22 and a winglet spar (not shown in FIGS. 1-2) passing through the wing panels. Exemplary wing spars and winglet spars are depicted in FIGS. 5-8 and described in detail below. Winglets 14, 16 are attached to the transverse end portions of the main wing at a relatively large angle, i.e. they are nearly orthogonal to the main wing. For example, the winglets may be attached to the main wing at an angle between 60-100 degrees with respect to a plane defined by the main wing, i.e. where an angle of zero degrees indicates a winglet that is effectively an extension of the wing tip. This orientation exposes the winglets to a relatively large amount of low-angle solar radiation.

Figure 3:
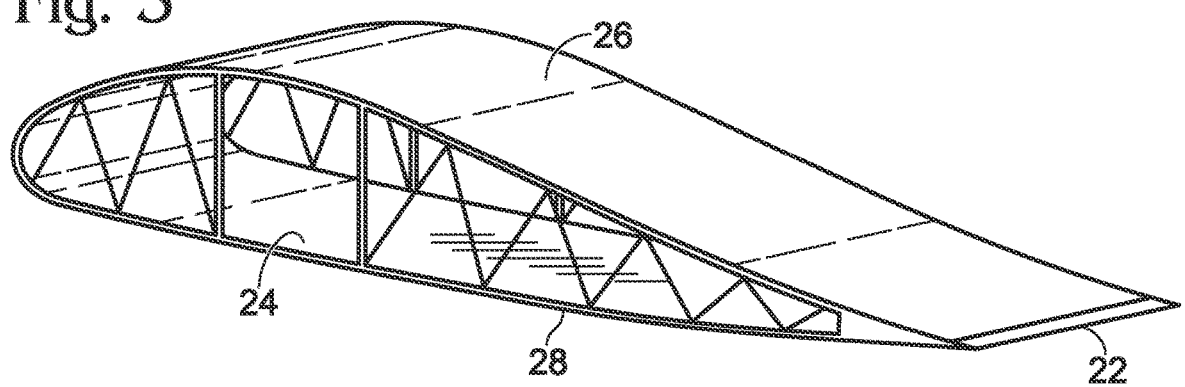
FIG. 3 is a tri-metric view of a portion of a modular solar wing panel embodiment, according to aspects of the present disclosure.

FIG. 3 is a magnified tri-metric view of an exemplary wing panel 22 that may be included in wing 12 and winglets 14, 16. Wing panels used in conjunction with the present teachings may be generally similar to the wing panels described in U.S. Patent Pub. No. 2013/0099063 to Grip et al., which has been incorporated by reference into the present disclosure. An exception to this similarity is that the spars passing through the wing panels may have different structures according to the present teachings. Spars contemplated by the present teachings will be described in detail below with reference to FIGS. 5-8. Generally speaking, suitable spars will pass through a complementary aperture 24 (shown in FIG. 3) formed in each of wing panels 22. Apertures 24 are depicted in this exemplary embodiment as substantially rectangular, but more generally the apertures formed in the wing panels may have any desired shape to receive a spar with a complementary shape.

As indicated in FIG. 3, solar panels 26, 28 may be mounted to one or both sides of the wing panel and may collectively provide the energy gathering portion of a solar power system for airplane 10. In general, at least one solar panel may be mounted to the main wing and each winglet. In some cases, one or more solar panels may be mounted to all of the wing panels of both the main wing and the winglets of airplane 10. In the case of wing panels used in main wing 12, in some cases solar panels may be disposed only on the upper surface of the wing panels, because the bottom surface of the main wing is not expected to be exposed to a significant amount of solar radiation. In the case of wing panels used in winglets 14, 16, solar panels may be disposed on both sides of the wing panels, to maximize the amount of solar radiation collected by the panels on the winglets.

The dimensions of main wing 12 and winglets 14, 16 may be selected to provide airplane 10 with various characteristics, such as the ability to collect a desired amount solar energy, to withstand particular weather conditions, to stay aloft for an indefinite time, and/or to meet other goals. For example, the aspect ratio of the wing may be between 9 and 15. This is significantly less than the aspect ratio of previously developed solar airplanes, which typically have aspect ratios of at least approximately 20 and in some cases over 40.

In addition, the winglet span, which is defined as the winglet length expressed as a fraction of the main wing semi-span (i.e., as a fraction of one half of the total length of the main wing), may be relatively large. For example, the winglet span may be between 0.2 and 0.7, or between 0.3 and 0.5. In other words, the winglets may, for example, be 0.1 times the length of the main wing (corresponding to a winglet span of 0.2) up to 0.35 times the length of the main wing (corresponding to a winglet span of 0.7). In combination with the high angle of attachment of winglets 14, 16 to main wing 12, this is a significant departure from the design of previously developed solar airplanes, which typically have no high-angle winglets at all.

As suggested by FIGS. 1-3, substantially similar wing panels 22 may be used throughout airplane 10, including in main wing 12 and winglets 14, 16. Accordingly, the main wing and the winglets each may have a constant chord, which is defined as the straight line distance between leading and trailing edges of the wing or winglet. In some cases, the chord of each winglet and the chord of the main wing may all be constant and equal to each other. In other cases, the chord of each winglet may be constant but slightly different than the constant chord of the main wing, such as 0.7 to 1.5 times the chord of the main wing. In still other cases, the chord of the main wing and/or the chord of each winglet may vary. In these cases, the chord of each winglet still may be equal to the chord of the main wing where the winglet meets the main wing, or the chord of each winglet may be 0.7 to 1.5 times the chord of the main wing where the winglet meets the main wing.

Figure 4:
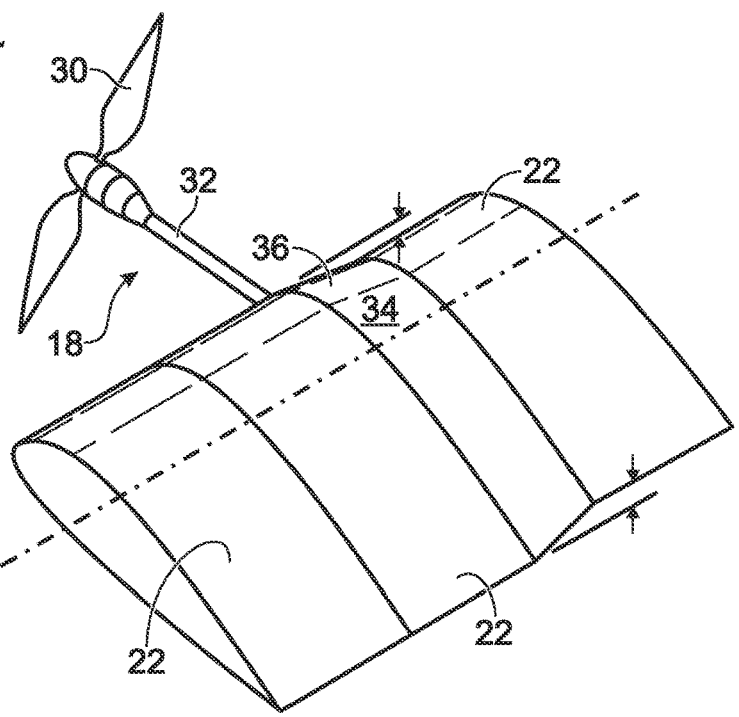
FIG. 4 is a tri-metric view of an exemplary propulsion module integrated between wing panels, according to aspects of the present disclosure.

FIG. 4 is an isometric view of a propulsion module 18 disposed between a pair of adjacent wing panels 22. Specifically, there are two wing panels 22 to the left of propulsion module 18, and a single wing panel 22 to the right of the propulsion module. Each propulsion module includes a propeller 30, a boom or motor pylon 32 that connects the propeller and motor (not shown) to the wing structure, a motor controller and other propulsion systems (also not shown), and an aerodynamic fairing 34, which is described in more detail below. Although FIGS. 1A and 2 depict a plurality of propulsion modules, the number of propulsion units may vary. For example, in some cases only a single propulsion unit may be used, as depicted in FIG. 1B. In other cases (not shown), a single propulsion module may be used on each of the main wing and each winglet.

Each propulsion module performs several functions. For instance, it connects the motor and propeller to the wing spar sections. The exact orientation of the motor and propeller with respect to the wing surface may vary from propulsion module to module to provide a favorable relationship between the propeller and the airflow at the propeller. Variations include the "yaw" angle as seen in a plan view, and a "pitch" angle as seen in a side view. There may also be variations in the distance between the propeller and the wing leading edge. The propulsion module may contain the motor controller and other components necessary to the propulsion system such as wiring, sensors, cooling and so on.

The propulsion module includes an aerodynamic fairing 34, which enables the propulsion module to fit between wing sections without significantly compromising the aerodynamics of the wing. The intention is to avoid interfering with the design and modularity of the wing panels, so propulsion module fairing 34 abuts (perhaps with a small gap) the neighboring wing panels 22 on either side. The width of the propulsion module (spanwise dimension) is sufficient to enclose the boom (pylon) linking the motor to the wing spar section. It may also enclose the motor controller and other systems mentioned above.

According to the present teachings, it may be desirable for a wing section of the airplane to include some degree of twist, and propulsion modules 18 may be used to help attain a desired level of twist in a wing section. More specifically, in some embodiments wing panels 22 may be aligned to provide an untwisted wing section, but in other cases it may be advantageous that the wing (or winglet), as a whole, is twisted in a laterally symmetric way. A typical form of twist is called "washout". Washout provides progressively reduced wing incidence, moving from the root to the tip of the wing. This favorable twist is in conflict with the simplification provided by untwisted wing sections.

One way to achieve a desired amount of wing twist is to provide discrete increments of twist at the junctions between wing panels, to approximate the optimal progressive twist. However, this method of providing wing twist results in discontinuities in the shape of the wing at each twisted junction. According to the present teachings, the propulsion module aerodynamic fairing 34 can soften this otherwise sharp discontinuity with a smoothly shaped transitional surface region 36 that blends to each neighboring wing panel 22. The spanwise dimension of the propulsion module may be chosen according to the severity of the incidence increment. That is, greater discontinuities may require a longer span transition to provide acceptable aerodynamic characteristics. Suitable twist increments at the propulsion module fall between 0.2° and 3°, with 0.5° being a typical value.

Referring again to FIGS. 1-2, exemplary airplane 10 also includes fuselage modules 20. In other embodiments, different numbers of fuselage modules may be provided, and in some cases fuselage modules may not be present. When fuselage modules are present as in airplane 10, they may be disposed between a pair of adjacent wing panels, and may be used to perform a variety of functions. For example, the fuselage modules may provide a launch and recovery system structure and mechanism. "Launch and recovery" is a general term that encompasses landing gear as well as other methods of launching and recovering an aircraft. A secondary function of fuselage modules may be to provide separation between the ground surface and the underside of the airplane and especially its propellers. This accounts for the substantially vertical form of fuselage modules 20 in FIGS. 1-2. In other cases, fuselage modules may be provided that have different shapes and/or that are disposed at different angles relative to the main wing.

Furthermore, in some embodiments, fuselage modules may house aircraft systems; may be integrated with a propulsion module; and/or may include some of the features described above for the propulsion modules, including an aerodynamic fairing between adjoining wing panels and a structural junction between adjoining wing spar sections to adjust twist, dihedral and/or sweep.

Example 2

This example describes various wing spar structures that may be used in a solar powered airplane according to aspects of the present teachings; see FIGS. 5-8.

The spar system of a solar powered airplane refers to the primary structural element linking all wing panels, wing sections, propulsion modules and fuselage modules together. Thus, the spar system spans the entire wing/winglet system of the airplane. A "spar" or "spar section" is a subset of the entire spar system, and a plurality of such spars or spar sections will typically be joined together to form the entire spar system.

A spar must connect the elements listed above with sufficient strength and rigidity. Spar strength pertains to structural failure during all phases of the airplane's operation, including flight, launch and recovery and ground operations. Rigidity pertains to the ability of the spar to hold the components in an acceptable relationship to one another so that aerodynamic and aeroelastic behavior is favorable or at least acceptable.

More specifically, there is a defined optimal aerodynamic shape for the airplane. Beyond that, there is an acceptable range of deformed shape that may occur periodically or occasionally due to turbulence or off-design flight conditions. It is the spar's responsibility to keep the shape within acceptable bounds during operations. "Aeroelastic behavior" pertains to aerodynamic-structural interactions that may result from turbulence. Another aeroelastic behavior pertains to periodic stable or unstable oscillations of the aircraft sometimes known as "flutter". Such behavior is generally unfavorable and may lead to structural failure or loss of control.

To accomplish the purposes describe above, the spar system requires certain strength and rigidity about three separate axes. Wing bending pertains to lift loads on the wing tending to flex the wing upwards or downwards as seen in the front view. Drag and thrust loads tend to flex the wing fore and aft as seen in the top view. Torsional loads tend to twist the wing about its spanwise axis, resulting in what may be an unfavorable wing twist distribution. It is a particular aspect of the present teachings that drag and thrust loads from the very large winglet panels may impose unusually large torsional loads on the main wing spar. Furthermore, the relatively large mass moment of inertia of these panels about the wing torsional axis may adversely affect wing flutter characteristics. A suitable spar system must account for these properties.

An ideal spar system should be reliable, lightweight and easy to connect, even in a non-factory setting such as a hangar. In addition, it may be desirable for the spar sections to be connectable in such a way that minor variations in orientation are possible. This includes variations in dihedral angle (a bend angle at the joint as seen in the front view), sweep angle (a bend angle at the joint as seen in the top view), and incidence angle (an increment in the twist angle at the spar segment joint about the longitudinal axis of the spar section).

Furthermore, a spar system should provide suitable hard points for mounting other airframe components, and load paths from these hard points to the primary structural elements should be direct and lightweight. Preferably, the spars of the spar system will also be inexpensive to manufacture, easy to repair, and straightforward to design and analyze. That is, it should have predictable characteristics. As described below, according to the present teachings, a truss-type spar system is believed to be particularly suitable for use in solar powered airplanes.

Generally, the wing spar structures disclosed herein are configured to pass through an aperture in a wing panel, such as aperture 24 in wing panels 22 (see FIG. 3), and thereby to provide a support structure for the wing panels and the entire wing or winglet. In some cases, each wing spar structure may be uniform in size along its length, and all wing spar structures used in the airplane may be identical. For example, this may be the case when all wing panels in the airplane are identical or nearly identical. In other cases, however, it may be desirable to vary the dimensions of wing spar sections along the wing span. For example, this may be the case if different wing panels are used at different positions in the wing, or if it is desirable to decrease the linear weight of the wing spar toward the wing tips. Thus, while only wing spar structures with uniform cross sections are described below and shown in the accompanying drawings, the present teachings also contemplate wing spar structures with varying cross section.

Furthermore, while wing spars with rectangular cross sections are described below for the sake of definiteness, more generally a wing spar with any desired cross section may be provided, such as cylindrical, oval, or polygonal with any number of sides. All such cross sections, among others, are contemplated by the present teachings.

Figure 5:
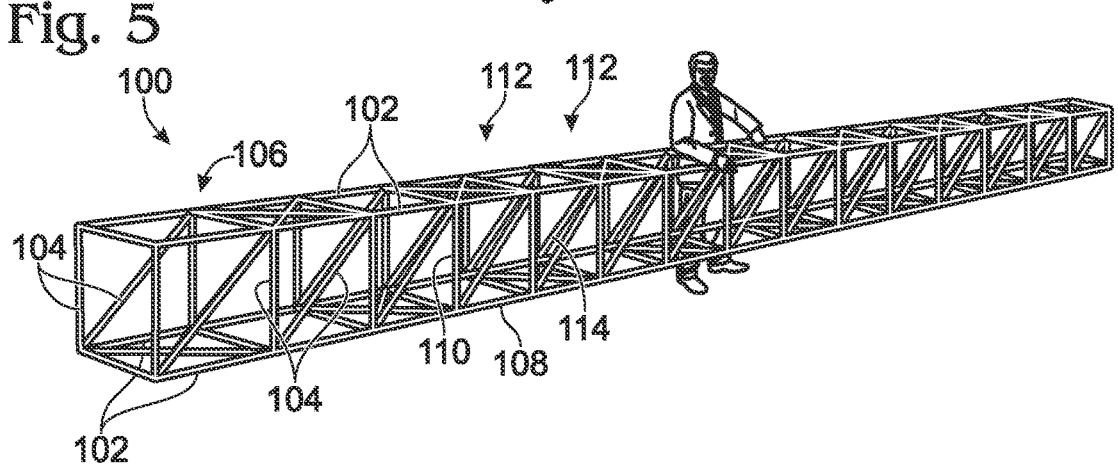
FIG. 5 is a perspective view of a wing spar section embodiment, according to aspects of the present disclosure.

FIG. 5 is a tri-metric view of a representative truss-type wing spar section embodiment, generally indicated at 100, according to aspects of the present disclosure. Wing spar section 100 is modular, i.e. it may be easily connected to neighboring wing spar section(s). This characteristic modularity enables the wing spar section to be first joined with its associated wing panels and later to be connected to its neighboring wing spar sections (and wing sections). Spar section 100 includes four longitudinal elements or longerons 102, and a plurality of interstitial elements 104 that have various orientations and that link the longerons to each other.

Figure 9:
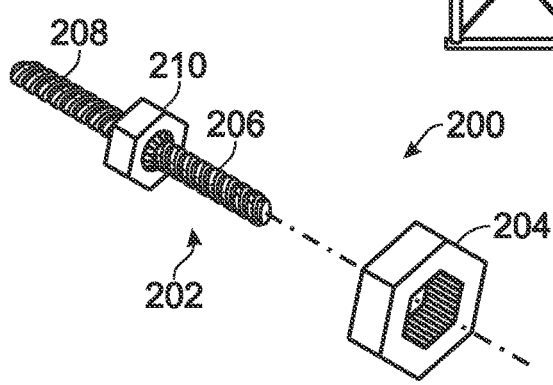
FIG. 9 is an exploded isometric view of an embodiment of a threaded rod and drive nut assembly that may be used to join wing spar sections, according to aspects of the present disclosure.
Figure 10:
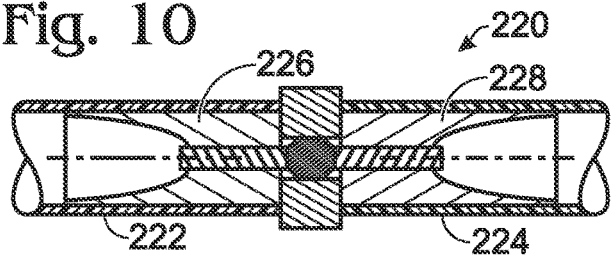
FIG. 10 is a sectional view of the threaded rod and drive nut assembly of FIG. 9 being used to join a pair of wing spar longerons in conjunction with a longeron joint, according to aspects of the present disclosure.
Figure 11:
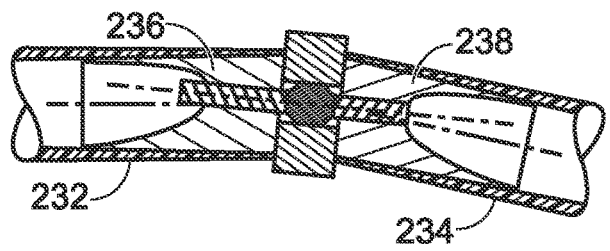
FIG. 11 is a sectional view of the threaded rod and drive nut assembly of FIG. 9 being used to join a pair of wing spar longerons in conjunction with another longeron joint, according to aspects of the present disclosure.

Joints (not shown in detail in FIG. 5) connect the interstitial elements to the longerons at intersection regions such as the regions generally indicated at 106. Exemplary connecting joints are shown in FIGS. 12-15 and described in detail below. Furthermore, connections between neighboring spar sections will typically be made only between the longerons. Such connections, and exemplary associated connection structures, are shown in FIGS. 9-11 and also described in detail below.

Returning to FIG. 5, longerons 102 and interstitial elements 104 are arranged in such a way that each (and every) element is loaded primarily in tension or compression. That is, all of the loads are resolved by tension or compression in the elements. This may be contrasted with other structural forms, such as a beam, in which loads are resolved in bending, or in shear webs in which loads are resolved in shear.

Figure 6:
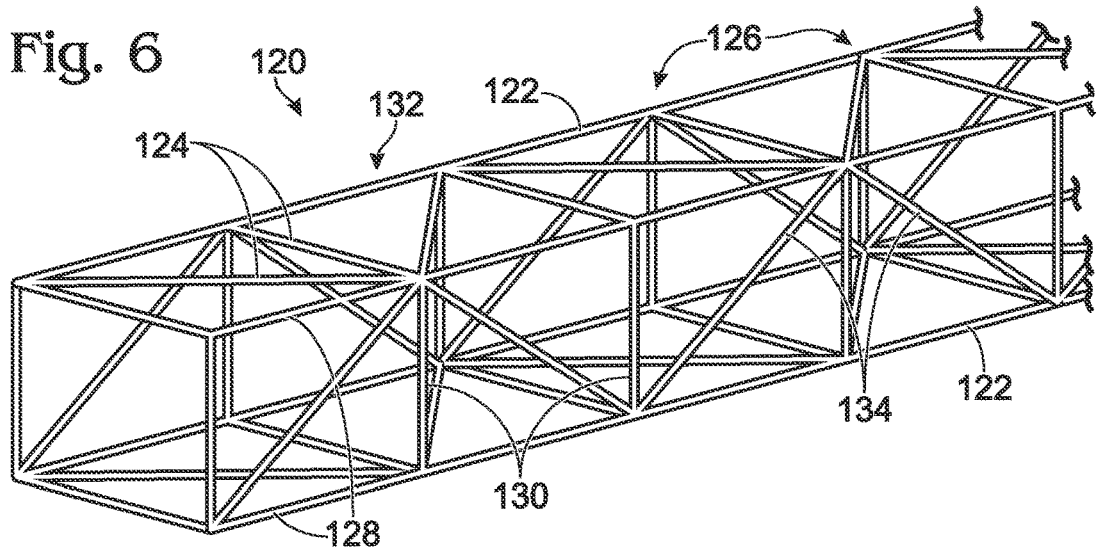
FIG. 6 is a tri-metric view of a portion of another wing spar section embodiment, according to aspects of the present disclosure.
Figure 7:
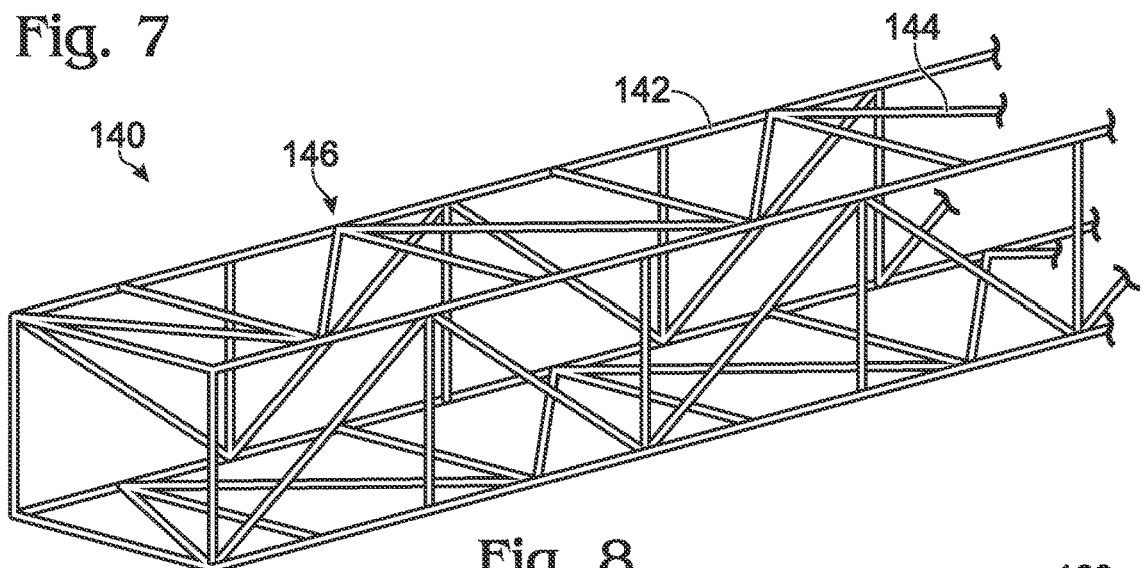
FIG. 7 is a tri-metric view of a portion of yet another wing spar section embodiment, according to aspects of the present disclosure.
Figure 8:
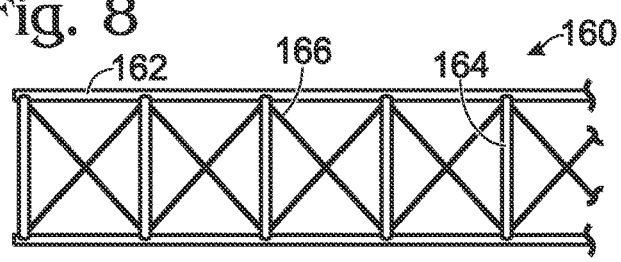
FIG. 8 is a front view of a portion of still another wing spar section embodiment, according to aspects of the present disclosure.

One feature of a well-designed truss, including truss 100 shown in FIG. 5 and also the other exemplary truss structures described below and shown in FIGS. 6-8, is that each element (longeron or interstitial element) is stable without the addition of extra, less-loaded elements. The means that each element does not buckle or cripple when the truss is subjected to anticipated loads. This contrasts with many other structural forms that require additional structural elements to stabilize the structure. An example of this is an airplane fuselage in which the thin metal skin is stabilized by slender longerons and transverse frames. Based on the aspects of truss structures described above, it may be possible to load each and every element in a truss to levels that use much or all of the structural material's capability. This may result in a very lightweight structure, which is particularly suitable for a solar powered airplane.

In truss structure 100 of FIG. 5, four longerons 102 are shown. Alternate numbers of longerons are possible, ranging from three to perhaps as many as eight. However, four longerons provide a favorable balance between number of interstitial elements and torsional rigidity. Four longerons may form a rectangular, trapezoidal or irregular four-sided truss cross section. A rectangular cross section, as is shown in FIGS. 5-8, provides the advantage of increased repeatability of joints with interstitial elements.

Longerons such as longerons 102 primarily resist bending loads from lift, drag or thrust. Loads are resisted by inherent (natural, automatic) variations in the tension and compression in the longeron elements. For example, upward bending of truss spar 100 results in compression in the upper longerons and tension in the lower longerons. Longerons 102 may be sized for anticipated loads or rigidity requirements. Geometric sizing variables include diameter or cross section dimensions and wall thickness.

Longeron sizing considerations include anticipated compression or tension forces, desired compression or tension rigidity, buckling and crippling. Bending rigidity (from lift, drag or thrust) may be controlled primarily by adjustments in the rigidity of the longeron elements, and rigidity of the interstitial elements has a weak effect in this regard. One type of favorable longeron is tubular (hollow). Longeron cross section shape may preferably be cylindrical. This provides favorable resistance to buckling and crippling. Another advantage of a hollow cylindrical longeron cross section is that it provides relative ease of making longeronto-longeron connections, as will be described below in more detail. Alternative shapes may be elliptical or rectangular (including square).

Longerons may be fabricated from many different materials. One favorable material is carbon fibers in an epoxy matrix ("carbon-epoxy"). This material system is strong, lightweight and rigid. It has especially good properties in compression, distinguishing it from many other advanced fibers. Alternative longeron materials include high strength aluminum or steel, which are used, for example, in ground-based trusses such as crane arms.

Interstitial elements 104, which also may be referred to as "web elements," connect longerons 102 and, in the exemplary rectangular truss sections described in this section, are typically disposed in vertical and/or horizontal planes between the longerons. The interstitial elements link the longerons in shear created by lift, drag and torsion about the spar's longitudinal axis. In general, compression and tension in the longerons arises from loads imposed by the interstitial elements. The interstitial elements also address vertical and horizontal compression that tend to force the longerons together. This is sometimes known as "core crushing."

For example, when the wing spar is flexed upwards, the upper longerons are compressed and the lower longerons are stretched. The upper longerons would like to spring outward (downward). The lower longerons would like to pull inward (upward). These movements are restrained by the force of the interstitial elements on the longerons, which are placed in compression by these forces. Similarly, a downward flexure of the wing also results in compression of the interstitial elements.

Spacing of the interstitial elements is coordinated with spacing of the wing panels described previously. This enables interstitial elements to connect the wing panel rib fittings to the wing spar with little additional material. For example, if the wing panels are spaced about 43.5" apart, location of a spar interstitial element at each 43.5" increment along the spar length provides coordination between the wing panels and the wing spar.

Interstitial elements may be sized according to the maximum anticipated load or needed rigidity and the length of the element. Sizing parameters of the interstitial elements that may be adjusted include the element diameter or cross section dimensions, and the thickness of the element wall. A circular cross section may be favorable in some embodiments. A leading alternative is a square cross section. In some cases, all interstitial elements may be tubular (hollow). In other cases, solid interstitial elements may be provided. In one embodiment, tension-only interstitial elements (i.e., interstitial elements that are positioned to receive only tension forces) may be solid, and the remaining interstitial elements may be hollow.

Wall thickness of the interstitial elements may be constant, or may vary along the length of the element or around the cross section of the element. One consideration in sizing an interstitial element is buckling. If the element is too long or has a cross section that is too small, it may buckle like a pole vault pole. Another consideration in sizing an interstitial element is crippling. If the wall thickness is small, it may tend to buckle locally at a small scale (similar to the manner in which a soda can fails in compression). Adjustments to the torsional rigidity of the wing spar may be made with adjustments to the rigidity of the interstitial elements. Rigidity of the longerons is less important in this regard. Interstitial elements may be formed from the same or similar materials as the longerons, as described above.

The nature of the design of truss section 100 permits approximately independent adjustments in wing bending rigidity and torsional rigidity, by adjusting the properties of the longerons and interstitial elements. This gives a desirable level of control in addressing aeroelastic behavior of the wing as a whole. This is important because aeroelastic behavior is a prominent concern for a lightweight airplane of the type contemplated by the present teachings. Aeroelastic behavior includes wing flutter. Wing flutter can lead to wing structural failure, which is typically catastrophic.

FIG. 5 shows one exemplary form of a truss-type wing spar section, in which the interstitial elements have a particular arrangement. Specifically, interstitial elements 104 of truss section 100 include horizontal elements 108 and vertical elements 110, which together with longerons 102 define a series of approximately cube-shaped volumes generally indicated at 112. Diagonal elements 114 connect opposite corners of four of the six sides of each cube-shaped volume.

More generally, the exact arrangement of the interstitial elements may take numerous forms. The general idea is that the interstitial elements should resist core crushing in the vertical and horizontal plane and should transfer shear, also in the horizontal and vertical plane. It is also an object of the interstitial elements that they take approximately all of the shear forces. This means that the interstitial elements will typically join with each other or very near to each other. FIGS. 6-8 depict some additional exemplary arrangements of interstitial elements, which are described in more detail below. These may be "mixed-and-matched".

FIG. 6 is an isometric view of a portion of another wing spar section embodiment, generally indicated at 120, according to aspects of the present disclosure. Wing spar section 120 of FIG. 6 is similar in most respects to wing spar section 100 of FIG. 5, so details regarding the possible sizes, materials and other properties of the elements of spar section 120, all of which are the same as described previously with respect to spar section 100, will not be repeated.

Wing spar section 120 includes longerons 122 and interstitial elements 124, which meet at intersection regions 126. Interstitial elements 124 include horizontal elements 128 and vertical elements 130, which together with longerons 122 define a series of approximately cube-shaped volumes generally indicated at 132. Diagonal elements 134 connect opposite corners of four of the six sides of each cube-shaped volume. All of the above is similar to wing spar section 100. In a distinction from spar section 100, however, diagonal elements 134 of spar section 120 reverse orientation along the length of the spar section.

FIG. 7 is an isometric view of a portion of yet another wing spar section embodiment, generally indicated at 140, according to aspects of the present disclosure. Again, wing spar section 140 includes longerons 142 and interstitial elements 144, which meet at intersection regions 146. However, the intersection regions in spar section 140 are staggered along the length of the spar section, so that the longerons and interstitial elements do not define cube-shaped volumes. The resulting separated joints in the horizontal and vertical plane may allow a simplified joint design, as each joint only accommodates elements lying within a single plane.

FIG. 8 is a front view of a portion of still another wing spar section embodiment, generally indicated at 160, according to aspects of the present disclosure. Spar section 160 includes longerons 162, interstitial elements 164, and cable bracing diagonals 166. Spar section 160 might be identical as seen in any other orthogonal view, or the structure shown in FIG. 8 could be combined with a different structure in other planes. Spar section 160 is distinguished from the previously described arrangements in that cable bracing diagonals 166 are inherently only capable of accommodating tension forces, but cannot accommodate compressive forces due to their non-rigid nature.

Other possible truss designs include different arrangements of perpendicular interstitial elements combined with diagonal interstitial elements, all diagonal interstitial elements (i.e., in a zig-zag pattern), and various combinations of perpendicular elements combined with X-elements (rectangles connected at their corners), among others.

Example 3

This example describes an exemplary connection structure that may be used to connect together the longerons of wing spar structures used in a solar powered airplane according to aspects of the present teachings; see FIGS. 9-11.

FIG. 9 is an exploded isometric view of an embodiment of a threaded rod and drive nut assembly, generally indicated at 200, which may be used to join the longerons of wing spar sections, according to aspects of the present disclosure. Assembly 200 includes a threaded rod 202 and drive nut 204, details of which are described below.

Threaded rod 202 is a continuous rod with opposing halves 206, 208. The two halves of rod 202 respectively have left and right hand threads, for reasons explained below. Threaded rod 202 also includes hex-drive surface 210 disposed at the middle of the rod. Hex-drive surface 210 is a hexagonal solid that may be integral to the threaded rod. For example, in some cases the threaded rod may be turned from hexagonal stock, leaving the hex drive. In other cases, hex-drive surface 210 may be fastened to the threaded rod by brazing, welding, bonding or other means. The hexagonal form of surface 210 is merely exemplary. In other cases, the drive surface could be a square or other regular or irregular polygon, a splined shape (like a car drive shaft coupling), or any other suitable shape to which a twisting force may be applied.

Drive nut 204 fits over the threaded rod and couples to hex-drive surface 210. It also fits between the longerons connected by assembly 200. For reasons described below, the drive nut is generally at least slightly wider than the hex-drive. Furthermore, the drive nut is able to slide along the axis of the threaded rod while remaining coupled to the hex drive. The drive nut is not necessarily hexagonal on its outer face. Other shapes that permit applying torque to the drive nut may be used in some cases, and the outer face of the drive nut need not be the same shape as the shape of hex-drive surface 210, provided the inner face of the drive nut couples to the hex-drive surface.

FIG. 10 is a sectional view of a longeron joint, generally indicated at 220, which may be used to join a pair of wing spar longerons together according to aspects of the present disclosure. More specifically, joint 220 uses the threaded rod and drive nut assembly 200 of FIG. 9 to join a pair of wing spar longerons 222, 224. Each longeron has inserted within it a threaded insert, indicated at 226, 228 respectively. Each insert fits within the end of the associated longeron, and may be attached to the interior of the longeron by friction, adhesive bonding or any other suitable method. Threads in each insert match those of the complementary threads of threaded rod 202 of assembly 200.

Joint 220 transfers approximately axial loads from one longeron to the next. It is not intended to transfer bending loads, but since it is a characteristic of the contemplated truss structures that elements have little bending stress, transfer of bending loads is not needed. Axial loads are transferred from one longeron to the next as follows. First, the axial force is transferred from a longeron to its threaded insert via a bonded or other connection. Next, the force is transferred from the threaded insert to the threaded rod via the thread interface. This load places the threaded rod in tension even if the load on the longeron is in compression. The load path on the other side of the joint is symmetrical to that described above. The tension load imposed on both threaded inserts 226, 228 is resolved by compressing the drive nut. The end of the longeron may also be compressed against the drive nut.

The process of assembly of two four-longeron trusses is as follows. Two trusses are mounted in some form of stable tooling. The adjoining ends of the trusses are brought into alignment and close proximity. Four threaded rods together with their drive nuts are threaded a short distance into one of the of the spar sections. In some cases, one end of the threaded rod may be longer than the other to permit this while keeping the integral hex-drive centered when fully assembled. The neighboring truss section is brought up to engage the four protruding threaded rods.

Using the hex-drive (or alternative) surfaces, the threaded rods are simultaneously or successively turned to draw the two adjacent spar sections together. These should be turned at approximately the same rate so that alignment is maintained among all of the pairs of adjacent longerons. When the spar sections are drawn all the way together, each drive nut may be rotated with a desired torque. This has the effect of tensioning the threaded rods. The object is to clamp the drive nuts with sufficient force that no anticipated tension load on each longeron will separate the threaded inserts from the drive nut. This pre-tension load prevents the threaded rod from experiencing cycles of increased and decreased tension, with the object of avoiding structural fatigue on the threaded rod and the threaded insert. Disassembly is the reverse of the assembly process.

The fact that the drive nut is wider than the hex-drive, and able to slide along the axis of the threaded rod while remaining coupled to the hex drive, permits the threaded rod to be fully tightened to compress the threaded inserts against the drive nut and to tension the threaded rod. Without the sliding feature, for instance if the integral hex-drive were enlarged, the hex-drive would tend to jam against one threaded insert before the other, preventing compression across the hex-drive and preventing tensioning the threaded rod.

Using joint 220, different longeron cross section dimensions (diameter for instance) can be accommodated. This can be done simply by providing different threaded inserts for the different sizes of longerons. According to the present teachings, in some cases threaded inserts may be tapered on their inner surfaces, as in the case of inserts 226, 228 shown in FIG. 10. This may result in a more even transfer of load from the longeron to the insert. Tapering also reduces the weight of the insert. In other cases, suitable threaded inserts may be un-tapered, for example they may have cylindrical outer surfaces.

In some cases, the longerons need not be coaxial as shown in FIG. 10, but rather may be attached at a relative angle. This is depicted in FIG. 11, which is a sectional view of another longeron joint, generally indicated at 230, which may be used to join a pair of wing spar longerons together according to aspects of the present disclosure. As in the case of joint 220 of FIG. 10, joint 230 of FIG. 11 uses the threaded rod and drive nut assembly 200 of FIG. 9 to join a pair of wing spar longerons 232, 234.

Each longeron in FIG. 11 again has inserted within it a threaded insert, now indicated at 236, 238 respectively. Each insert fits within the end of the associated longeron, and may be attached to the interior of the longeron by friction, adhesive bonding or any other suitable method. Threads in each insert match those of the complementary threads of threaded rod 202 of assembly 200. In the case of joint 230, however, longerons 232, 234 are not coaxial. As depicted in FIG. 11, this is accomplished by forming apertures in the inserts for receiving threaded rod 202, where one or both of the apertures is offset and/or angled relative to the longeron axis to permit relative rotation of one truss about the longitudinal axis.

Also as shown in FIG. 11, in some cases the threaded inserts may be tapered on their outer surfaces, alternatively or in addition to having a tapered inner surface. For instance, the outer surface of each insert could be the surface of a portion of a cone. This may correspond with a tapered bore within the longeron. Tapering of this type may facilitate control of bond line thickness and quality while also providing a taper to the longeron wall thickness that may provide a more favorable transfer of load from the longeron to the insert.

The dimensions of the components of longeron joints such as joints 220 and 230 can be adjusted to accommodate different loads. Specifically, this can include adjusting the diameter and length of the threaded rod, and the diameter and length of the threaded inserts. In some cases, the optimum diameter or other dimensions of the longeron may arise from consideration of the joint design and its weight.

Example 4

This example describes exemplary joint structures, which also may be referred to as "web joints," that may be used to connect together the longerons and interstitial elements of wing spar structures used in a solar powered airplane according to aspects of the present teachings; see FIGS. 12-15.

Web joints join the interstitial members to each other and to the longerons. The characteristics of a suitable web joint for use in a solar powered airplane include adequate strength, reliability, light weight, and ease of fabrication and assembly. With respect to adequate strength, the loads in each truss element can be estimated with some confidence by those skilled in the art, and these loads can be used to estimate the required strength of each connection. With respect to reliability, the truss designs proposed in the present disclosure have limited redundancy due to the severe penalty of excess weight to vehicle performance. This means that a failure of any single joint may lead to a catastrophic failure of the entire airplane. For this reason, the joint design and manufacturing process preferably results in reliable joints with consistent performance. With respect to weight, solar powered airplanes are weight sensitive. The joint design therefore must be weight-efficient. Finally, with respect to ease of fabrication and assembly, each airplane has many joints between interstitial members. A quick and simple method to join the members is therefore desirable.

An exemplary web joint concept is described below. It is assumed in this example that the longerons and interstitial elements have circular or approximately circular cross sections, but in some embodiments that may not be the case, and the web joints may be suitably modified. In general, variations on the embodiments described below can be made that work with any other cross sections or mixed cross sections. The relative diameters of longerons and interstitial members can also vary—they do not have to be the same even when attaching to a single particular web joint.

FIG. 12 is an isometric view of a web joint embodiment, generally indicated at 250, which may be used to join together wing spar longerons and interstitial elements, according to aspects of the present disclosure. FIG. 13 is a partially transparent top view of joint 250, and FIG. 14 is a partially transparent elevational view taken from the direction at the bottom of FIG. 13. Joint 250 is configured to join interstitial elements with a longeron within a single plane, and therefore may be particularly suitable for use with a truss spar structure such as the structure depicted in FIG. 7 and described above.

Web joint 250 takes the form of a multi-part "lug" that conforms to the external shape of the tubes at the joint. Specifically, as can perhaps best be seen in FIG. 14, joint 250 includes an upper lug member 252 and a lower lug member 254, which are joined together to form apertures 256, 258, 260, 262 for receiving longerons and/or interstitial elements. For example, joint 250 may be configured to receive a longeron 264 and interstitial elements 266, 268, as can be seen in FIGS. 12-13. The lug members 252, 254 may be formed from a pre-molded and pre-cured carbon-epoxy laminate. The members may be joined to the pre-positioned truss elements following the application of glue on the faying surfaces.

Figure 15:
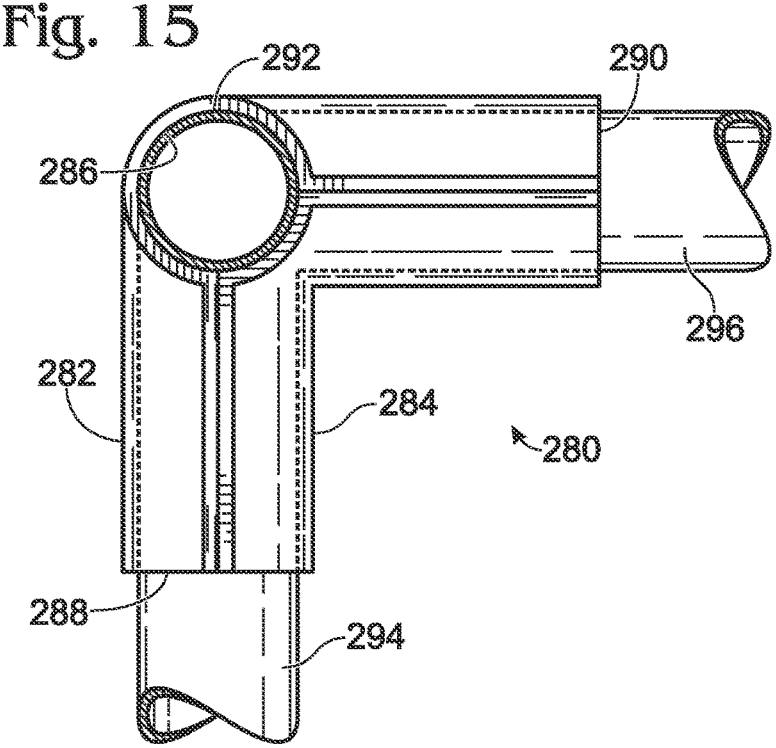
FIG. 15 is a side elevational view of another joint structure embodiment that may be used to join together wing spar longerons and interstitial elements, according to aspects of the present disclosure.

FIG. 15 is a side elevational view of another web joint embodiment, generally indicated at 280, which may be used to join together wing spar longerons and interstitial elements, according to aspects of the present disclosure. Joint 280 is configured to join interstitial elements with a longeron within two different planes at right angles to each other, and therefore may be particularly suitable for use with a truss spar structure such as the structures depicted in FIGS. 5-6 and described above.

Web joint 280, like joint 250, takes the form of a multi-part "lug" that conforms to the external shape of the tubes at the joint. Specifically, joint 280 includes a first lug member 282 and a second lug member 284, which are joined together to form apertures such as apertures 286, 288, 290 for receiving longerons and/or interstitial elements. For example, joint 280 may be configured to receive a longeron 292 and interstitial elements 294, 296. As is apparent in FIGS. 5-6, one or more additional interstitial elements may be disposed behind elements 294, 296 and received in additional apertures formed by joint 280. Again, the lug members 282, 284 may be formed from a pre-molded and pre-cured carbon-epoxy laminate, and the members may be joined to the pre-positioned truss elements following the application of glue on the faying surfaces.

Example 5

Figure 16:
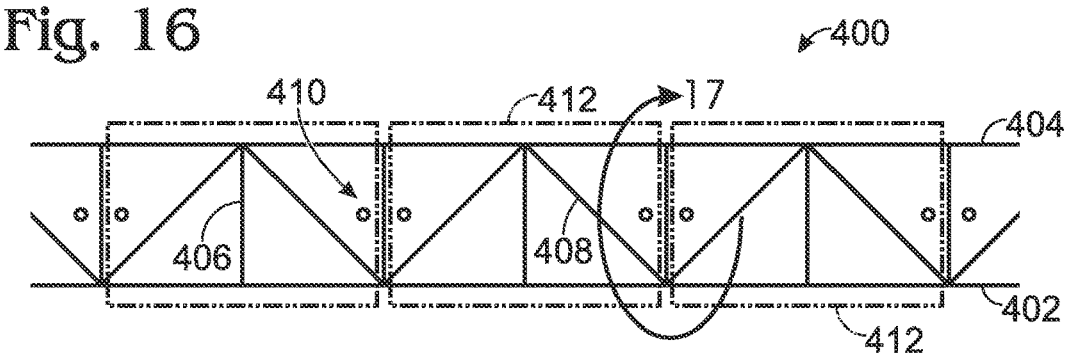
FIG. 16 is a schematic front elevational view of a portion of a wing spar embodiment including mounting points for wing panels, according to aspects of the present disclosure.
Figure 17:
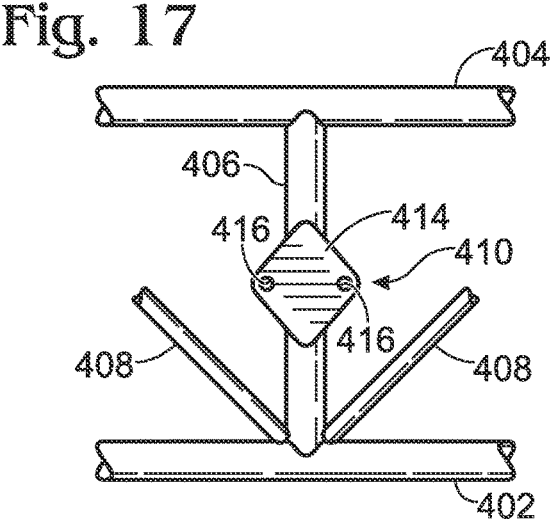
FIG. 17 is a magnified view of a portion of the wing spar embodiment of FIG. 15.

This example describes exemplary mounting structures that may be used to assemble wing panels, propulsion modules, fuselage modules and/or tanks relating to energy storage to a wing spar section, according to aspects of the present disclosure; see FIGS. 16-17.

FIG. 16 is a schematic front elevational view of a portion of an exemplary wing spar section 400 for a solar powered airplane, according to aspects of the present disclosure. Wing spar section is shown having a particular configuration of interconnected longerons 402, 404, vertical interstitial elements 406 and diagonal interstitial elements 408, but more generally can take various forms, including any of the truss-like forms described above. Wing spar section 400 includes a plurality of mounting points 410 for wing panels, which are schematically indicated at 412. Wing panels 412 may, for example, be similar to the wing panels previously described in this disclosure.

FIG. 17 is a magnified view of a portion of the wing spar embodiment of FIG. 16, showing an exemplary mounting point 410 in more detail. Each mounting point may include, for example, a mounting plate 414 connected to a vertical interstitial element 406, with a plurality of fastener apertures 416 or other suitable attachment structures (e.g., pins, bolts, weld points, and/or the like) formed in the mounting plate. Accordingly, components of a solar powered airplane may be provided with complementary mounting structures that allow the components to be secured to the wing spar. A similar set of mounting points may be provided at the rear of the wing spar, so that each airplane component may be mounted to both the front and rear of the spar. In some cases, additional mounting points may be provided at the top and bottom of the wing spar, as an alternative or in addition to the mounting points at the front and rear of the spar.

As noted previously, some solar powered airplanes may preferably fly for multiple days. These airplanes need some form of energy storage. Exemplary energy storage mechanisms, which also may be referred to in this disclosure as "energy storage means," include pressurized chemical reactants and/or electrical batteries. Accordingly, one use of the mounting structures described in this example is to mount reactant tanks or batteries. This should preferably be done in a manner that avoids or at least minimizes strains in the wing spar structure being transferred to the energy storage mechanism, because if flexure in the wing spar is transferred to the energy storage means, the energy storage means may be stressed, damaged or fatigued by the flexure. This may reduce reliability of the energy storage means or may result in the need to strengthen the energy storage means with the accompanying undesirable increase in weight.

Because the energy storage means may be relatively heavy (in some cases, a significant fraction of the solar airplane's total weight) it may be advantageous to locate the energy storage means near the airplane's desired longitudinal (fore-aft) center of gravity. Furthermore, due the weight of the energy storage means, it may also be advantageous to distribute the energy storage means along the span of the airplane (the lateral dimension). The description below assumes that the energy storage means is a reactant gas stored in pressurized form within a lightweight tank. The concept can also be applied to other forms of energy storage. Furthermore, the lightweight tank is assumed to take the form of a cylinder with hemispherical end caps, but more generally can take any other suitable form.

According to the present teachings, and as described in more detail below, exemplary energy storage tanks are mounted within the truss spar cross section. Furthermore, the tanks are mounted to the truss spar in such a way that they are isolated from stresses arising from vertical flexure of the spar (from lift loads). In some cases, the tanks are also isolated from horizontal flexure of the spar (from drag or thrust loads).

Figure 18:
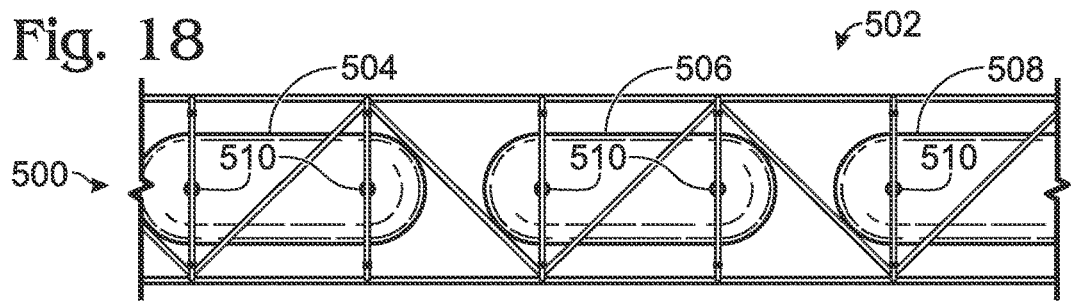
FIG. 18 is a schematic front elevational view of an exemplary energy storage system for a solar powered airplane, according to aspects of the present disclosure.

FIG. 18 shows a schematic front elevational view of a portion of an exemplary energy storage system, generally indicated at 500, for a solar powered airplane. Energy storage system 500 includes a wing truss structure generally indicated at 502, and a plurality of energy storage tanks 504, 506, 508. More generally, various numbers of energy storage tanks may be used. In FIG. 18, the lines of truss structure 502 represent the centerlines of the truss elements (i.e., the longerons and interstitial elements described previously). Each energy storage tank is mounted to the truss structure at a plurality of mounting points 510, with two mounting points shown for each tank in the front elevational view of FIG. 18.

Figure 19:
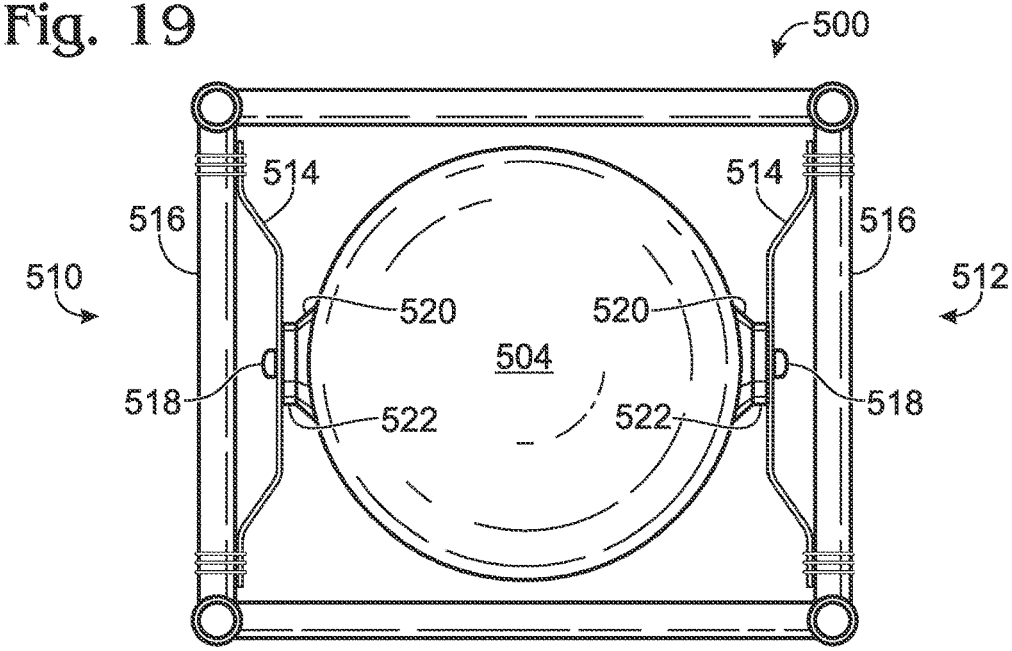
FIG. 19 is a side elevational view of the energy storage system of FIG. 18.

FIG. 19 is a side elevational view of system 500, showing some additional details of how energy storage tank 504 is mounted to truss structure 502. The same description applies to the other energy storage tanks. One of mounting points 510 is generally indicated at the right side of FIG. 19, and a complementary mounting point 512 is generally indicated at the left side of FIG. 19, corresponding to the back side of truss structure 502. Generally, a complementary mounting point 512 is provided opposite each mounting point 510. Thus, in this example, each tank has a total of four mounting points, two at the front side of the truss structure and two at the back side of the truss structure. These mounting points are located at the maximum width of the tanks at a spacing that corresponds to a multiple of the spacing module of the truss vertical elements.

FIG. 19 shows that each mounting point 510, 512 includes a flexible mounting bracket 514 connected to one of the truss vertical elements 516, for example with glue and wraps of thread. A fastener 518 connects each mounting bracket 514 to a corresponding mounting plate 520 on each side of tank 504. The mounting plates each may be fastened to the tank with an elastomeric interface 522 disposed between the mounting and the tank. This interface is intended to permit cycles of expansion and contraction in the tank from multiple pressurization cycles with little mutual stress generated by the interaction of the mounting plate and the tank wall.

Fasteners 518 may be located at the approximate neutral axis of the truss spar in vertical bending. For this reason, the spanwise location of four mounting fasteners remains fixed, avoiding transferring stresses to the tank from the truss spar. At the same time, vertical loads from the weight and inertia of the tank are efficiently transferred to the truss spar. In addition, the longitudinal location of the truss spar axis is not very far from the desired aircraft center of gravity. Thus, a location within the truss spar places the tank closer to the center of gravity than any other location internal to the wing. Because the wing retains a large chord from root to tip (and because it is relatively low in aspect ratio) there may be sufficient volume within the truss spar to contain all of the reactant tanks. An approximately optimal placement of the tanks is along the full span of the main wing.

Figure 20:
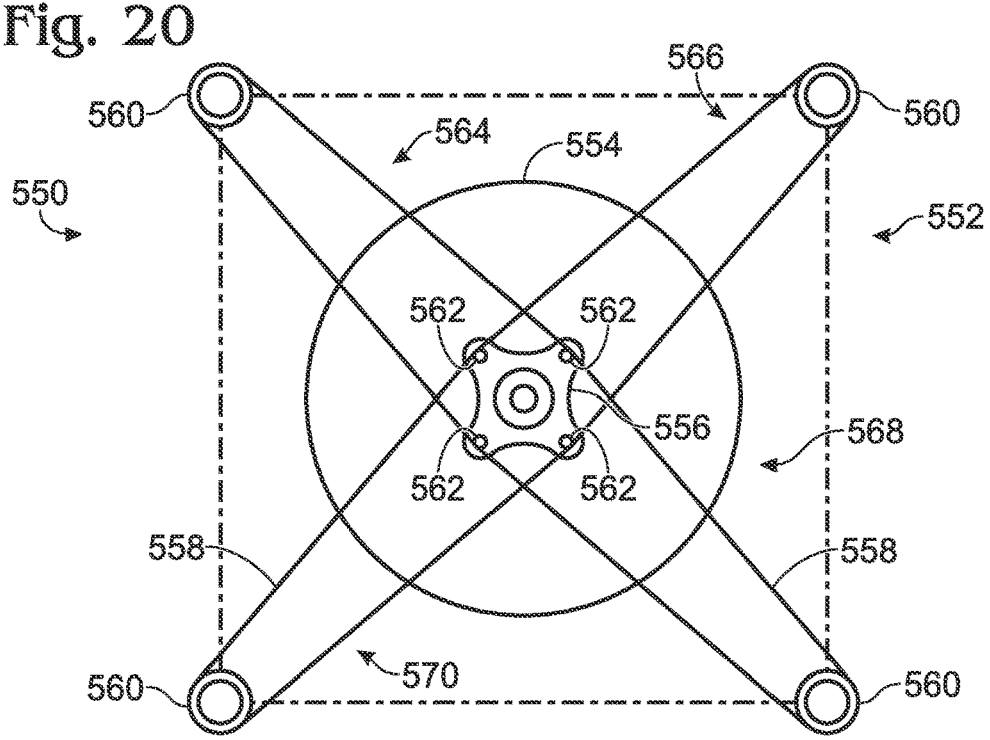
FIG. 20 is a schematic side elevation view of another exemplary energy storage system for a solar powered airplane, according to aspects of the present disclosure.

FIG. 20 shows a schematic side elevational view of another exemplary energy storage system, generally indicated at 550, for a solar powered airplane. Energy storage system 550 is similar to system 500 in that it includes a wing truss structure 552, and a plurality of energy storage tanks, one of which is indicated at 554, mounted to the truss structure. However, the manner of mounting the tanks to the truss structure is different in this embodiment.

Specifically, in this embodiment the tanks are supported from end bosses 556 rather than bonded fittings along the length. Each end boss 556 is connected to the truss structure with strong line or cable 558 that wraps around one or more of longerons 560 of truss structure 552 and applies a support force to one or more mounting fittings 562 located on each end boss. The depicted cable pattern prevents rotation of the tank (assuming the mounting fitting is fastened to the tank). Other cable patterns are possible that can also prevent rotation of the tank.

In this embodiment there are four sections of cable, respectively indicated at 564, 566, 568, 570 in FIG. 20, each of which is wrapped around a particular one of longerons

560. The points at which the cables wrap around the longerons may be co-planar, which may permit some longitudinal wobble on the part of the tank. Alternatively, the points at which cable sections 564 and 568 are wrapped around their respective longerons may be offset in one direction, and the points at which cables 566 and 570 are wrapped around their respective longerons may be offset in the other direction along the longeron. This provides location of the tank in all directions.

In the embodiment of FIG. 20, stresses from truss spar flexure (in lift and drag/thrust) are not transferred to the tank because the tank is supported at the neutral axis of the truss. Links (not shown) may be located at the fitting end of the cables to permit disconnection from the mounting fitting. This permits removal of the tank from the interior of the truss spar. This mounting arrangement stabilizes the rectangular truss, by preventing the truss from "paralellogramming" (tipping over) as seen in the end view. That is, it provides diagonal bracing.

In the energy storage tank mounting embodiments described above and depicted in FIGS. 18-20, mounting of the tanks near the airplane center of gravity and along the spanwise extent of the wing aids in providing an acceptable airplane center of gravity and reduces wing bending loads with the result of light wing spar weight. In addition, coupling of truss spar loads to the tanks is avoided or minimized, which permits lightweight tanks not subject to cyclic loads from wing flexure. Similarly, coupling of tank loads to the truss spar is avoided, so that as the geometry of each tank changes according to its internal pressure, these changes are not significantly transmitted to the truss spar. This permits a relatively lighter truss spar. The disclosed embodiments also provide direct, lightweight connection of the tanks to the primary wing truss spar structure, with very little additional structure required.

Example 6

This section describes additional aspects and features of a solar powered airplane according to aspects of the present disclosure, presented without limitation as a series of numbered paragraphs. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A. A solar powered airplane, comprising:
a truss-type wing spar;
a plurality of modular wing panels attached to the wing spar; and
a plurality of propulsion modules attached to the wing spar between the wing panels;
wherein each propulsion module includes an aerodynamic fairing that facilitates a predetermined amount of twist between neighboring wing panels by having a smoothly shaped transitional surface with first and second edges that differ in orientation by the predetermined amount of twist.

B. A truss-type wing spar for a solar powered airplane, comprising:
a plurality of longeron elements;
a plurality of interstitial elements each operatively connected to first and second parallel longeron elements; and
a plurality of web joints, each including first and second lug members configured to be joined together to enclose a portion of one of the longeron elements and a portion of at least one of the interstitial elements;
wherein each interstitial element has a first portion enclosed by a first web joint which also encloses a portion of the first longeron, and a second portion enclosed by a second web joint which also encloses a portion of the second longeron.

C. A joint for connecting two adjacent longerons of a truss-type wing spar for a solar powered airplane, comprising:
a threaded rod having a drive surface separating first and second threaded ends;
a drive nut configured to fit over the threaded rod and to engage the drive surface while remaining movable along the length of the rod; and
first and second threaded inserts, each configured to be attached securely within a hollow end portion of a longeron and to receive and engage one of the threaded ends of the threaded rod.

D. A method of assembling two truss-type wing spar sections together, comprising:
disposing threaded inserts within a hollow end portion of each longeron of the wing spar sections;
bringing adjoining end portions of the wing spar sections into alignment and close proximity;
threading threaded rods a short distance into the threaded inserts of each longeron of one of the wing spar sections, leaving a threaded portion of each threaded rod protruding from the longerons;
positioning the other wing spar section to engage the protruding threaded portions of the rods; and
rotating the threaded rods to draw the two spar sections together.

Advantages, Features, Benefits

The different embodiments of the solar powered airplane and components thereof described in this disclosure provide several advantages over known solar powered airplanes and other solutions for placing a payload over a relatively fixed position on the earth's surface for a long period of time. For example, the illustrative embodiments of the solar powered airplane described herein can maintain powered flight for long and perhaps indefinite periods of time, at a wide range of altitudes and in a wide range of weather conditions.

Additionally, and among other benefits, illustrative embodiments of the solar powered airplane described herein can include a modular structure with a predetermined and desired amount of twist in a wing section, without any sharp discontinuities. Furthermore, the present teachings provide robust structures and methods for connecting adjacent longerons and interstitial elements of a truss-type wing spar. No known system or device can perform these functions. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious.

Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. An aircraft, comprising:
   a main wing characterized by a wing span, a wing area and an aspect ratio;
   first and second winglets attached to a respective transverse end portion of the main wing at a fixed angle between 75-100 degrees with respect to a plane defined by the main wing, each of the winglets characterized by a winglet span; and
   a solar power system including at least one solar panel mounted to each of the main wing, the first winglet and the second winglet;
   wherein the winglet span is between 0.2 and 0.7.

2. The aircraft of claim 1, wherein the main wing and the winglets each include a plurality of modular wing panels and a truss-type spar passing through the wing panels.

3. The aircraft of claim 1, wherein a chord of each winglet is equal to a chord of the main wing where the winglet meets the main wing.

4. The aircraft of claim 3, wherein the chord of each winglet and the chord of the main wing are all constant.

5. The aircraft of claim 1, further comprising a plurality of propulsion modules, each propulsion module disposed between a pair of adjacent wing panels.

6. The aircraft of claim 5, further comprising at least one fuselage module disposed between a pair of adjacent wing panels.

7. The aircraft of claim 1, wherein the aspect ratio is between 9 and 15.

8. An aircraft, comprising:
   a main wing characterized by a wing span, a wing area and an aspect ratio;
   first and second winglets attached to a respective transverse end portion of the main wing at a fixed angle, each of the winglets characterized by a winglet span between 0.2 and 0.7; and
   a solar power system including at least one solar panel mounted to each of the main wing, the first winglet and the second winglet;
   wherein each winglet is attached to the main wing at an angle between 60-100 degrees with respect to a plane defined by the main wing.

9. The aircraft of claim 8, wherein the aspect ratio is between 9 and 15.

10. The aircraft of claim 8, wherein the main wing and the winglets each include a plurality of modular wing panels and a truss-type spar passing through the wing panels.

11. The aircraft of claim 8, wherein the main wing and each winglet are each further characterized by a chord, and wherein the chord of each winglet and the chord of the main wing are all constant and equal to each other.

12. The aircraft of claim 8, wherein the main wing includes a plurality of modular wing panels and a wing spar passing through the wing panels, and wherein the wing spar includes a plurality of spar sections with substantially rectangular cross sections.

13. A method of improving aircraft performance, comprising:
   providing a main wing characterized by a wing span, a wing area and an aspect ratio;
   attaching first and second winglets to a respective transverse end portion of the main wing at a fixed angle, each of the winglets characterized by a winglet span; and
   mounting at least one solar panel to each of the main wing, the first winglet and the second winglet;
   wherein the aspect ratio is between 9 and 15; and
   wherein the winglets are attached to the main wing at an angle between 60-100 degrees with respect to a plane defined by the main wing.

14. The method of claim 13, wherein the winglet span is between 0.2 and 0.7.

15. The method of claim 14, wherein the winglet span is between 0.3 and 0.5.

16. The method of claim 13, wherein the main wing and the winglets are each further characterized by a chord, and wherein the chord of each winglet and the chord of the main wing are all constant and equal to each other.

17. The method of claim 13, wherein the main wing and the winglets each include a plurality of modular wing panels and a spar passing through the wing panels.

18. The method of claim 17, wherein the spars each include at least one spar section with a substantially rectangular cross section.

19. The aircraft of claim 8, further comprising a plurality of propulsion modules, each propulsion module disposed between a pair of adjacent wing panels.

20. The aircraft of claim 19, further comprising at least one fuselage module disposed between a pair of adjacent wing panels.

* * * * *